(12) United States Patent
Dippl et al.

(10) Patent No.: US 9,057,945 B2
(45) Date of Patent: Jun. 16, 2015

(54) X-RAY APPARATUS WITH A RADIATION DETECTOR

(75) Inventors: Thomas Dippl, Pressath (DE); Philip Materne, Kulmain (DE); Thomas Will, Kastl (DE)

(73) Assignee: Siemens Aktiengesellschaft, München (DE)

( * ) Notice: Subject to any disclaimer, the term of this patent is extended or adjusted under 35 U.S.C. 154(b) by 438 days.

(21) Appl. No.: 13/291,805

(22) Filed: Nov. 8, 2011

(65) Prior Publication Data

US 2012/0114106 A1    May 10, 2012

(30) Foreign Application Priority Data

Nov. 10, 2010 (DE) .......................... 10 2010 043 717

(51) Int. Cl.
*H01J 31/49* (2006.01)
*G03B 42/02* (2006.01)
*G03B 42/04* (2006.01)

(52) U.S. Cl.
CPC ................ *G03B 42/02* (2013.01); *G03B 42/04* (2013.01)

(58) Field of Classification Search
CPC .............................. G03B 42/04; G03B 42/025
USPC .................................. 378/193, 196, 197, 189
See application file for complete search history.

(56) References Cited

U.S. PATENT DOCUMENTS

| 6,382,832 | B1 * | 5/2002 | Schwieker et al. | 378/196 |
| 7,834,325 | B2 | 11/2010 | Nakata | |
| 2006/0018431 | A1 * | 1/2006 | Kanemitsu | 378/117 |
| 2007/0221859 | A1 | 9/2007 | Nakata | |
| 2008/0159486 | A1 * | 7/2008 | Hesl et al. | 378/189 |

FOREIGN PATENT DOCUMENTS

| CN | 1723850 A | 1/2006 |
| DE | 11 14 085 B | 9/1961 |
| DE | 28 54 458 A1 | 6/1980 |
| DE | 196 33 355 C2 | 11/2002 |

OTHER PUBLICATIONS

German Office Action dated Jun. 28, 2011 for corresponding German Patent Application No. DE 10 2010 043 717.4 with English translation.
Chinese Office Action dated Sep. 5, 2014 for corresponding Chinese Patent Application No. 201110355295.0 with English translation.

* cited by examiner

*Primary Examiner* — Hoon Song
(74) *Attorney, Agent, or Firm* — Lempia Summerfield Katz LLC

(57) ABSTRACT

The present embodiments relate to an X-ray apparatus having a movable detector housing, in which a radiation detector is arranged. The X-ray apparatus includes at least one releasable interlock device configured to inhibit or enable the maneuverability of the movable detector housing. At least one control element is arranged on the movable detector housing, using which the at least one releasable interlock device is actuated. At least one grab handle element is also arranged on the movable detector housing. The movable detector housing is movable by hand and is holdable by a patient using the at least one grab handle element.

15 Claims, 2 Drawing Sheets though approximately 20° in direction of rotation 11 and through approximately 90° in direction of rotation 12. The detector housing 1 is tilted exclusively by hand, in that the operator of the X-ray system grasps a scissor-type handle that includes a fixed first scissor-type handle element 13 and a movable second scissor-type handle element 14 with one hand and at the same time, pulls the movable second scissor-type handle element 14 with his/her fingers toward the fixed first scissor-type handle element 13. This causes an electronic signal for releasing a tilt interlock device 15 arranged in the detector housing 1 to be emitted and as a consequence, the horizontal axis of rotation 10 to be released for a movement. With the first and second scissor-type handle elements 13, 14 continuing to be pressed together, the detector housing 1 may be moved in that the operator exerts a force by hand onto the fixed first scissor-type handle element 13 and moves the detector housing 1 in a desired direction. Once the intended position has been reached, the horizontal axis of rotation 10 is locked again by the movable second scissor-type handle element 14 being released. FIG. 1 also shows one of two patient grab handles 16 mounted on the detector housing 1. The patient may hold on to the two patient grab handles 16 while an X-ray is being taken in order to provide the immobility of the body for the X-ray.

X-RAY APPARATUS WITH A RADIATION DETECTOR

This application claims the benefit of DE 10 2010 043 717.4, filed on Nov. 10, 2010.

BACKGROUND

The present embodiments relate to an X-ray apparatus with a radiation detector.

X-ray apparatus having radiation detectors configured as vertically arranged flat-panel detectors may be used for recording horizontal images (e.g., radiographs of the thorax). In such an arrangement, a patient stands between a radiation source and a radiation detector measuring the radiation. The radiation source and the radiation detector are, for example, focused on a region of the body of the patient that is to be exposed. In order to allow X-ray images of different regions of the body to be acquired, the radiation source and the radiation detector are adjustable vertically. The X-ray source may be vertically adjustable by way of a ceiling-mounted displacement mechanism. The radiation detector is arranged on a floor-standing column and is vertically height-adjustable by way of a separate displacement mechanism. The vertical movement of the radiation detector may be effected either by way of a motor drive or by hand. A manually executed movement of the relatively heavy radiation detector is made possible using counterweights that are arranged via chains and pulleys in an appropriately dimensioned enclosure of the column. In addition to the vertical movement, some implementations of radiation detectors also allow the radiation detector to be tilted in order to acquire specific types of images. During the acquisition of an X-ray image, the patient to be examined may hold on to two patient grab handles that are mounted on the detector housing in order to stabilize his/her position.

FIG. 1 is a schematic representation of a detector housing according to the prior art. FIG. 1 shows a radiation detector 2 arranged in a detector housing 1 and embodied in the form of a flat-panel detector that is mounted on a column 3 and is vertically adjustable in height by way of guide rails (not shown) arranged on the column 3. An operator of the X-ray system may adjust the height of the detector housing 1 either by a motor drive or by hand. The motor-driven control device is controlled via a height-adjusting control element 4 that includes a first pushbutton 5 for initiating an upward movement that is to be executed and a second pushbutton 6 for initiating a downward movement that is to be executed. When the first pushbutton 5 or the second pushbutton 6 is actuated, an electronic signal that sets in motion a motor-driven vertical movement of the detector housing 1 is generated. The movement is terminated as soon as the pressed first pushbutton 5 or the pressed second pushbutton 6 is released. In order to effect an upward or downward movement of the detector housing 1 by hand, the operator of the X-ray system actuates a pull handle that includes a rigid handle portion 7 fixedly connected to the detector housing 1 and a movable T-shaped pusher 8 having a separate displacement mechanism (not shown) arranged in the interior of the detector housing 1. Pulling on the T-shaped pusher 8 causes an electronic signal to be generated, via which a height-adjustment interlock device 9 of the detector housing 1 that is arranged in the column 3 is released. As long as the T-shaped pusher 8 remains pulled, the detector housing 1 may be moved up or down as desired by a force applied by hand to the rigid handle portion 7. Ceasing to pull on the T-shaped pusher 8 causes the height-adjustment interlock device 9 to be electronically activated again.

In addition to the vertical height adjustment of the detector housing 1, a movement may be effected about a horizontal axis of rotation 10, whereby the detector housing 1 may be tilted. For example, the housing 1 with the radiation detector 2 may be tilted from the 0° position shown in FIG. 1

SUMMARY AND DESCRIPTION

A disadvantage of the known X-ray system is that separate handle elements (e.g., a pull handle, a scissor-type handle) are used for the height adjustment and for the tilting movement of the detector housing. The patient grab handle is not connected in any way to the handle elements or the control elements for the motor-assisted height adjustment. The pull handle used for the vertical movement, like the scissor-type handle used for the tilting movement, requires a disproportionately high investment of material and long assembly and installation times, and has a high level of susceptibility to faults. Due to the space-hungry design of the pull handle and the scissor-type handle, the pull handle and the scissor-type handle are only mounted on one side of the detector housing, with the result that there is no optimal two-sided control capability. Additionally, it may sometimes be difficult to access the pull handle and the scissor-type handle. Due to size, the patient grab handles mounted on both sides of the detector housing are reinforced internally with a cost-intensive metal core in order to provide stability.

The present embodiments may obviate one or more of the drawbacks or limitations in the related art. For example, an improved X-ray apparatus with a radiation detector may be provided.

One embodiment of an X-ray apparatus includes a movable detector housing, in which a radiation detector is arranged. The X-ray apparatus includes at least one releasable interlock device in order to inhibit or enable the maneuverability of the movable detector housing. At least one first control element, via which the interlock device is actuated, is arranged on the movable detector housing. Additionally, at least one grab handle element, using which the movable detector housing may be moved by hand and may be held by a patient, is arranged on the movable detector housing. The at least one grab handle element is arranged on the movable detector housing such that a hand that is clasping a grab handle element of the at least one grab handle element may actuate the control element as well. A common handle is advantageously provided for moving the movable detector housing and as a steadying device for a patient to be examined. Due to the high level of integration of the control concept, material costs are lowered, and assembly and installation time and effort are reduced as a result of the simplification. Providing one control point for tilting and adjusting the height of the movable detector housing brings about an improvement in the ergonomics of the control elements on the movable detector housing. In addition, operator control of the radiation detector on both sides of the apparatus is realized at no great additional cost.

In one embodiment, the movable detector housing may be movable along a vertical axis and/or along a horizontal axis of rotation. The height adjustment provided for acquiring horizontal X-ray images and tilt positions of the radiation detector are accordingly made possible.

In one embodiment, the first control element may be mounted on a side wall of the detector housing. Optimal ergonomics for grasping the at least one grab handle element with the hand while at the same time operating the control element with the fingers is achieved as a result of the first control element being mounted at the side. The first control element is easier for an operator to access due to the side-mounted arrangement.

In another embodiment, the X-ray system may include a second control element mounted on a side wall. A motor-driven movement of the movable detector housing may be controlled using the second control element. The side-mounted arrangement of the second control element makes the second control element easier for the operator of the X-ray system to access.

The radiation detector may also be implemented as a flat-panel detector.

In one embodiment, the X-ray system may be implemented as a bucky wall unit of conventional design.

DETAILED DESCRIPTION OF THE DRAWINGS

Figure 1:
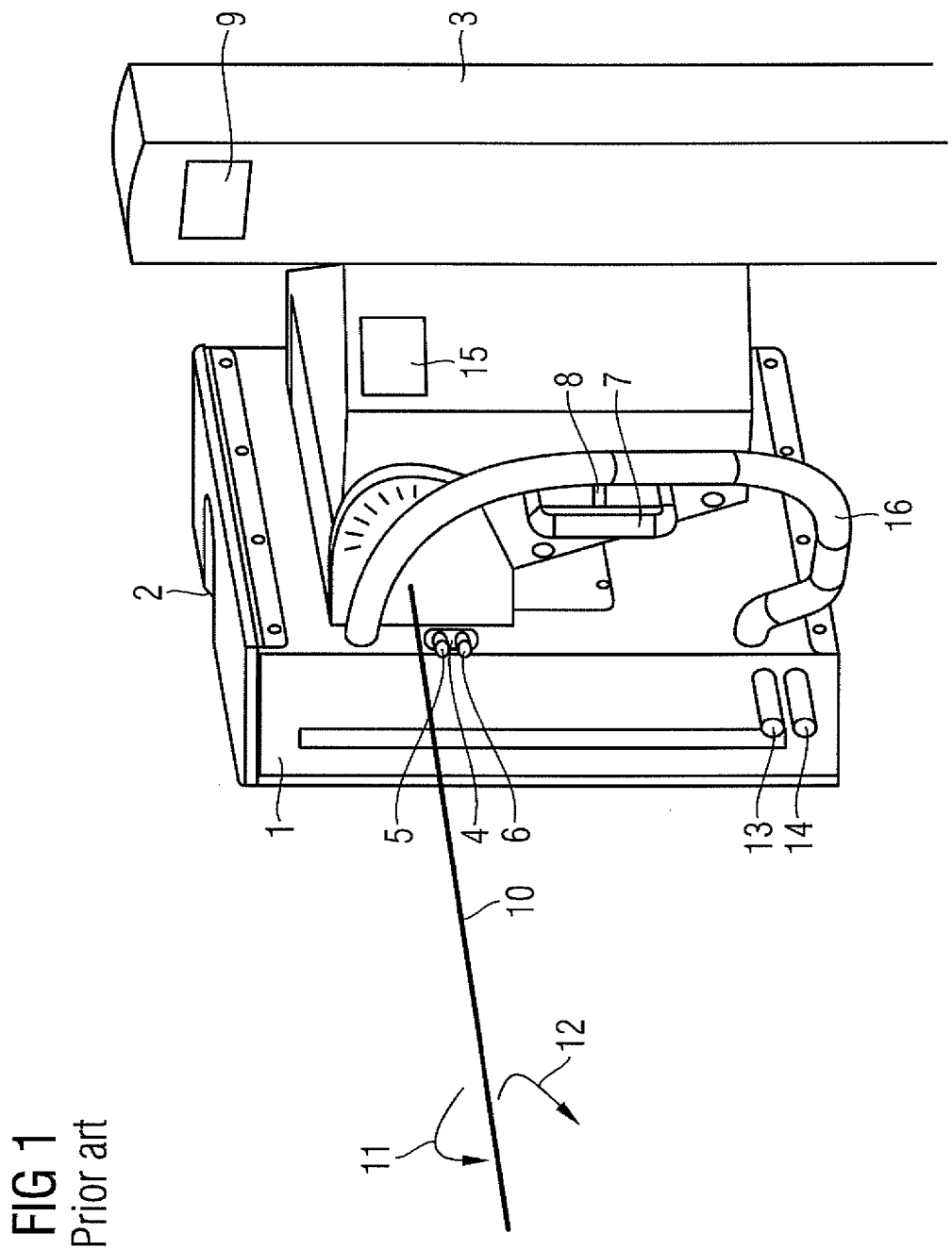
FIG. 1 is a schematic representation of a detector housing according to the prior art.
Figure 2:
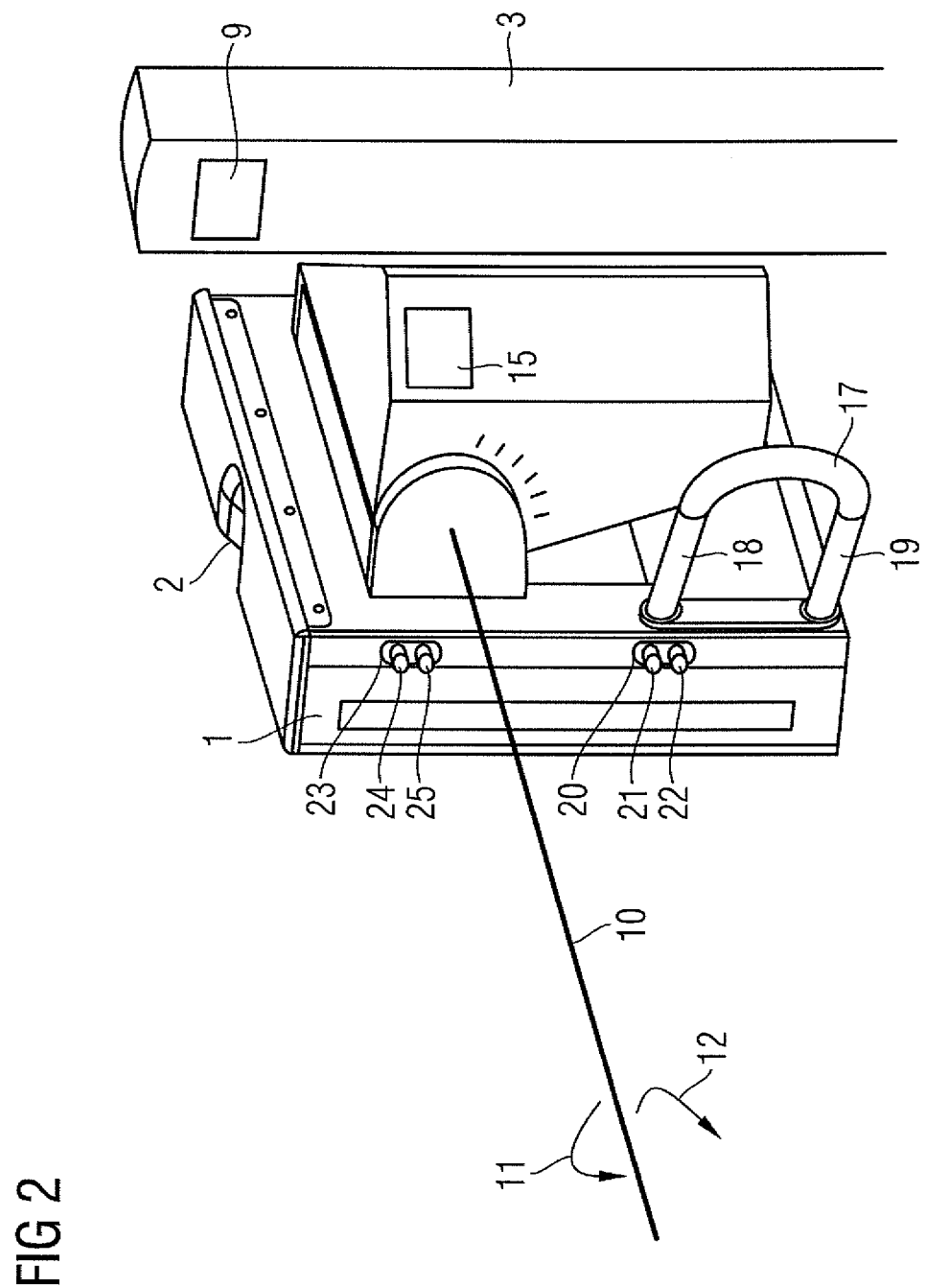
FIG. 2 is a schematic representation of one embodiment of a detector housing.

FIG. 2 shows a schematic representation of one embodiment of a detector housing, in which a radiation detector is arranged.

FIG. 2 shows a radiation detector 2 arranged in a detector housing 1 of an X-ray system. The radiation detector is embodied in the form of a flat-panel detector that is mounted on a column 3 and is vertically adjustable in height by way of guide rails (not shown) arranged on the column 3. An operator of the X-ray system may adjust the height of the detector housing 1 either using a motor drive or by hand. In order to effect an upward or downward movement of the detector housing 1 by hand, the operator grasps an upper portion 18 of a grab handle element 17 with four fingers, for example, of his/her hand. A first control element 20 including a first pushbutton 21 and a second pushbutton 22 is arranged spatially close to the upper portion 18 of the grab handle element 17 such that the thumb of the hand clasping the upper portion 18 may conveniently reach the first pushbutton 21 and the second pushbutton 22. Pressing the first pushbutton 21 causes an electronic signal to be generated, via which a height-adjustment interlock device 9 arranged in the column 3 is released. As long as the first pushbutton 21 remains pressed, the detector housing 1 may be moved up or down as desired using a force applied by hand to the upper portion 18 of the grab handle element 17. Releasing the first pushbutton 21 causes the height-adjustment interlock device 9 to be electronically activated again.

If the operator wishes to tilt the detector housing 1, then the second pushbutton 22 is to be actuated instead of the first pushbutton 21. Pressing the second pushbutton 22 causes an electronic signal for releasing a tilt interlock device 15 arranged in the detector housing 1 to be emitted and as a consequence, a horizontal axis of rotation 10 to be released. With the second pushbutton 22 depressed, the detector housing 1 may be moved by the operator exerting a force by hand onto the upper portion 18 of the grab handle element 17 and moving the detector housing 1 in a desired direction. Once the intended position has been reached, the second pushbutton 22 is released, thereby locking the horizontal axis of rotation 10 again.

Operator control of the motor-driven control device (not shown) is effected using second control elements 23 mounted on the side walls, only one control element 23 of which is shown in FIG. 2. The second control elements 23 include a third pushbutton 24 for initiating an upward movement and a fourth pushbutton 25 for initiating a downward movement. When the third pushbutton 24 or the fourth pushbutton 25 is actuated, an electrical signal that sets in motion a motor-driven vertical movement is generated. The movement is terminated when the pressed first pushbutton 24 or the pressed second pushbutton 25 is released. The second control elements 23 are mounted at the side so as to be more easily accessible to the operator of the X-ray system.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An X-ray apparatus comprising:
   a movable detector housing, in which a radiation detector is arranged;
   a releasable interlock device operable to inhibit or enable the maneuverability of the movable detector housing;
   a first control element mounted on the movable detector housing, the first control element operable to actuate the releasable interlock device;
   a second control element mounted on the movable detector housing, the second control element operable to initiate motor-driven movement of the movable detector housing; and
   a grab handle element mounted on the movable detector housing, the movable detector housing being movable by hand and being holdable by a patient using the grab handle element during acquisition of an X-ray image with the X-ray apparatus,
   wherein the grab handle element is arranged such that the first control element is actuatable by a hand that is clasping a portion of the grab handle element, and
   wherein the portion of the grab handle element is closer to the first control element than the second control element.

2. The X-ray apparatus as claimed in claim 1, wherein the movable detector housing is movable along a vertical axis, along a horizontal axis of rotation, or along the vertical axis and the horizontal axis of rotation.

3. The X-ray apparatus as claimed in claim 1, wherein the first control element is mounted on a side wall of the movable detector housing.

4. The X-ray apparatus as claimed in claim 1, wherein the radiation detector is a flat-panel detector.

5. The X-ray apparatus as claimed in claim 1, wherein the X-ray apparatus is a bucky wall unit.

6. The X-ray apparatus as claimed in claim 2, wherein the first control element is mounted on a side wall of the movable detector housing.

7. The X-ray apparatus as claimed in claim 2, wherein the radiation detector is a flat-panel detector.

8. The X-ray apparatus as claimed in claim 3, wherein the radiation detector is a flat-panel detector.

9. The X-ray apparatus as claimed in claim 5, wherein the radiation detector is a flat-panel detector.

10. The X-ray apparatus as claimed in claim 2, wherein the X-ray apparatus is a bucky wall unit.

11. The X-ray apparatus as claimed in claim 3, wherein the X-ray apparatus is a bucky wall unit.

12. The X-ray apparatus as claimed in claim 6, wherein the X-ray apparatus is a bucky wall unit.

13. The X-ray apparatus as claimed in claim 4, wherein the X-ray apparatus is a bucky wall unit.

14. The X-ray apparatus as claimed in claim 1, wherein the grab handle element comprises a first portion, a second portion, and a third portion, the first portion being an upper portion relative to the movable detector housing and the second portion being a lower portion relative to the moveable detector housing, and wherein the portion of the grab handle element is the upper portion of the gab handle element.

15. The X-ray apparatus as claimed in claim 1, wherein a portion of the grab handle element closest to the second control element is closer to the first control element than the second control element.

* * * * *